US012687423B2

(12) United States Patent
Wu et al.

(10) Patent No.: US 12,687,423 B2
(45) Date of Patent: Jul. 21, 2026

(54) U-SHAPED PLATE FOR WEIGHING MODULE AND WEIGHING MODULE COMPRISING SAME

(71) Applicants: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Youyi Wu, Changzhou (CN); Chunhui Li, Changzhou (CN); Zhihe Chao, Changzhou (CN); Jinjie Cai, Changzhou (CN); Chenggang Ding, Changzhou (CN); Shenhui Wang, Changzhou (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 276 days.

(21) Appl. No.: 18/687,924

(22) PCT Filed: Sep. 1, 2022

(86) PCT No.: PCT/CN2022/116556
§ 371 (c)(1),
(2) Date: Feb. 29, 2024

(87) PCT Pub. No.: WO2023/030455
PCT Pub. Date: Mar. 9, 2023

(65) Prior Publication Data
US 2025/0027807 A1 Jan. 23, 2025

(30) Foreign Application Priority Data

Sep. 3, 2021 (CN) .......................... 202111031552.5

(51) Int. Cl.
*G01G 21/28* (2006.01)
*G01G 21/23* (2006.01)

(52) U.S. Cl.
CPC ............. *G01G 21/28* (2013.01); *G01G 21/23* (2013.01)

(58) Field of Classification Search
CPC ...... G01G 21/23; G01G 21/28; G01G 23/002; G01G 23/02; G01G 23/04
See application file for complete search history.

(56) References Cited

U.S. PATENT DOCUMENTS 5,539,158 A  7/1996 Utsunomiya et al.
5,756,943 A * 5/1998 Naito ................... G01L 1/2243
177/229

(Continued)

FOREIGN PATENT DOCUMENTS

CN 101078649 A 11/2007
EP 0738882 A2 * 10/1996 ............... G01G 3/13

*Primary Examiner* — Randy W Gibson
(74) *Attorney, Agent, or Firm* — Standley Law Group LLP; Jeffrey S. Standley; Adam J. Smith

(57) ABSTRACT

A U-shaped plate for a weighing module and a weighing module having the same are disclosed. The U-shaped plate includes an upper end surface connecting a first and second side surface, each including a bottom end and an upper portion together forming four corners of the U-shaped plate and providing an inverted U-shaped structure formed by bending a flat and straight metal sheet. A lower width of the U-shaped plate is greater than an upper width thereof. The U-shaped plate includes an opening for mounting a sensor which extends from the bottom end of the first side surface to the upper portion of the second side surface via the upper (Continued)

end surface. Each of the four corners provide a recessed structure. When used with a weighing module, the U-shaped plate matches the sensor. An integrated molding design overcomes defects and realizes safety and practicability.

13 Claims, 6 Drawing Sheets

(56) References Cited

U.S. PATENT DOCUMENTS

| | | | |
|---|---|---|---|
| 6,835,899 B2 * | 12/2004 | Wolfe ................ | G01G 19/4142 |
| | | | 177/144 |
| 7,214,893 B2 * | 5/2007 | Sikula .................... | G01G 21/23 |
| | | | 177/DIG. 9 |
| 7,980,129 B2 * | 7/2011 | Jaeger .................... | G01G 19/52 |
| | | | 73/290 V |
| 9,612,150 B2 * | 4/2017 | Perrea .................. | G01G 23/005 |
| 11,029,192 B2 | 6/2021 | Shrestha et al. | |
| 2015/0226601 A1 * | 8/2015 | Perrea .................. | G01G 23/005 |
| | | | 177/145 |
| 2015/0308886 A1 * | 10/2015 | Shinozaki .............. | G01G 23/06 |
| | | | 177/180 |

* cited by examiner

U-SHAPED PLATE FOR WEIGHING MODULE AND WEIGHING MODULE COMPRISING SAME

BACKGROUND OF THE INVENTION

Technical Field

The present invention relates to the field of weighing modules, and in particular to a U-shaped plate for a weighing module and a weighing module comprising same.

Background Art

In the prior art, charging tanks and silos, due to their large capacity and high danger coefficient, have increasing requirements on weighing with the development of refinement, so that a demand for weighing modules with large capacity and high-safety requirement is created. A weighing module is generally mounted at a supporting leg or a supporting lug of a charging tank or a silo to implement static or dynamic weighing of the charging tank.

FIG. 1 is a schematic structural diagram of a weighing module in the prior art. As shown in FIG. 1, the weighing module is generally composed of a sensor, a top plate 100, an intermediate plate 200, and a bottom plate 300. Generally, one end of the intermediate plate 200 is fixedly connected to one of the top plate 100 and the bottom plate 300 while the other end is in fit connection with the other of the top plate 100 and the bottom plate 300, so that a safety protection function required for the whole weighing module and its application is realized.

Conventionally, the intermediate plate 200 of the weighing module is formed of three or more boards by tailored welding (as shown in FIG. 1), which results in high cost for material maintenance and complex production management due to a large number of parts. Multiple boards are subjected to tailored welding, resulting in a complex weld seam structure, a tedious welding process, excessive weld seams leading to welding deformation.

In order to reduce the welding deformation, extra postweld machining is required, which results in a complex processing procedure, a high processing cost, too many transfer procedures, and other defects. Even more, the tailored-weld boards have different shapes, and include multiple flat plates, or multiple bending plates, which make the structure too complex.

In addition, most of the existing intermediate plates for the module are designed into a closed structure. As shown in FIG. 1, a box-type closed structure is formed after the tailored welding of the plates, which does not meet the requirements of a hygienic design, and is difficult to clean.

In view of this, the inventor of this application has improved the structure of the U-shaped plate for a weighing module, to overcome the above technical problems.

SUMMARY

The technical problem to be solved in the present invention is to overcome defects such as a complex structure, a high processing cost, and washing difficulty of an intermediate plate used in the weighing module in the prior art. Provided is a U-shaped plate for a weighing module and a weighing module comprising same.

The present invention solves the above technical problems by means of the following technical solution:

AU-shaped plate for a weighing module, said U-shaped plate comprising a first side surface, a second side surface, and an upper end surface connecting the first side surface and the second side surface; the first and the second side each comprising a bottom end and an upper portion together forming four corners of the U-shaped plate. The U-shaped plate is of an inverted U-shaped structure formed by bending a flat and straight metal sheet. A lower width of the U-shaped plate is greater than its upper width. The U-shaped plate is further characterized by an opening for mounting a sensor, wherein said, opening extends from the bottom end of the first side surface to the upper portion of the second side surface via an upper end surface wherein each of the four corners of the U-shaped plate is configured as a recessed structure.

According to an embodiment of the present invention, the opening comprising at least a pair of inwardly formed notches and the upper end surface of the U-shaped plate is provided with limiting holes.

According to an embodiment of the present invention, each of the first side surface and the second side surface comprising an inner portion and an outer portion extending on either side of the inner portion such that the inner portion and outer portion of the side surface is positioned opposing the inner portion and outer portion of the second side surface.

According to an embodiment of the present invention, the outer portions of the first side surface and the second side surface are provided with at least a connecting hole each such that the two connecting holes are symmetrically aligned facing each other.

According to an embodiment of the present invention, the opening is provided in the inner portion of the U-shaped plate.

According to an embodiment of the present invention, a width of the opening is one third of a length of the U-shaped plate.

According to an embodiment of the present invention, the inwardly formed notches are symmetrical in their configuration and positioned on either side of the opening facing each other.

According to an embodiment of the present invention, the upper end surface of the U-shaped plate is flat.

According to an embodiment of the present invention, the U-shaped plate is an integrally formed structure.

According to an embodiment of the present invention, an angle of 8°-10° is formed between the recessed structure and a vertical direction.

According to an embodiment of the present invention, the recessed structure, in a normal direction, is half of a height of the U-shaped plate.

According to an embodiment of the present invention, the width of the U-shaped plate is consistent from top to bottom, or the U-shaped plate is narrow at the top and wide at the bottom.

The present invention further provides a weighing module, characterized in that the weighing module includes a top plate assembly, a bottom plate assembly, a sensor, and the U-shaped plate for a weighing module as described above, wherein the U-shaped plate is mounted on the bottom plate assembly, the sensor is mounted in the opening of the U-shaped plate and located between the top plate assembly and the bottom plate assembly, and the top plate assembly is connected to the limiting holes of the U-shaped plate through top plate studs.

The following are the positive and advanced effects of the present invention:

According to the present invention, the U-shaped plate for a weighing module and the weighing module comprising same are provided; and the U-shaped plate having a novel structure, a nice appearance and a reliable performance, which when used with the weighing module, perfectly matches the sensor. The design of integrated molding overcomes the above-mentioned defects, realizes safety and practicability, improves competitiveness and provides solution meets various requirements.

According to the present invention, the number of parts can be reduced, the total weight can be decreased, the processing time can be shortened, the processing cost can be saved, the hygienic design can be provided, a new solution can also be provided to users, and product competitiveness and use safety can be comprehensively improved, for example, the U-shaped plate is arranged in the middle of the weighing module, and is connected to the top plate or the bottom plate of the module to achieve various mechanical protection functions required by the module, such as horizontal limiting, tipping prevention, drop protection, and daily maintenance of the module.

BRIEF DESCRIPTION OF THE DRAWINGS

The above and other features, properties and advantages of the present invention will become clearer based on the description below in conjunction with the accompanying drawings and embodiments, and the same features are denoted by the same reference numerals throughout the figures, in which.

BRIEF DESCRIPTION OF THE DRAWINGS

Figure 1:
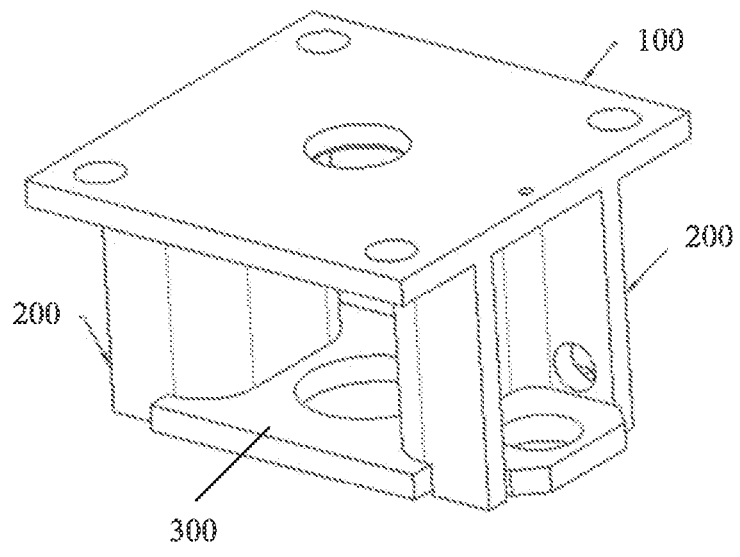
FIG. 1 is a schematic structural diagram of a weighing module in the prior art.

To make the above objectives, features, and advantages of the present invention more apparent and easier to understand, specific implementations of the present invention will be described in detail below in conjunction with the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the accompanying drawings denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

Figure 2:
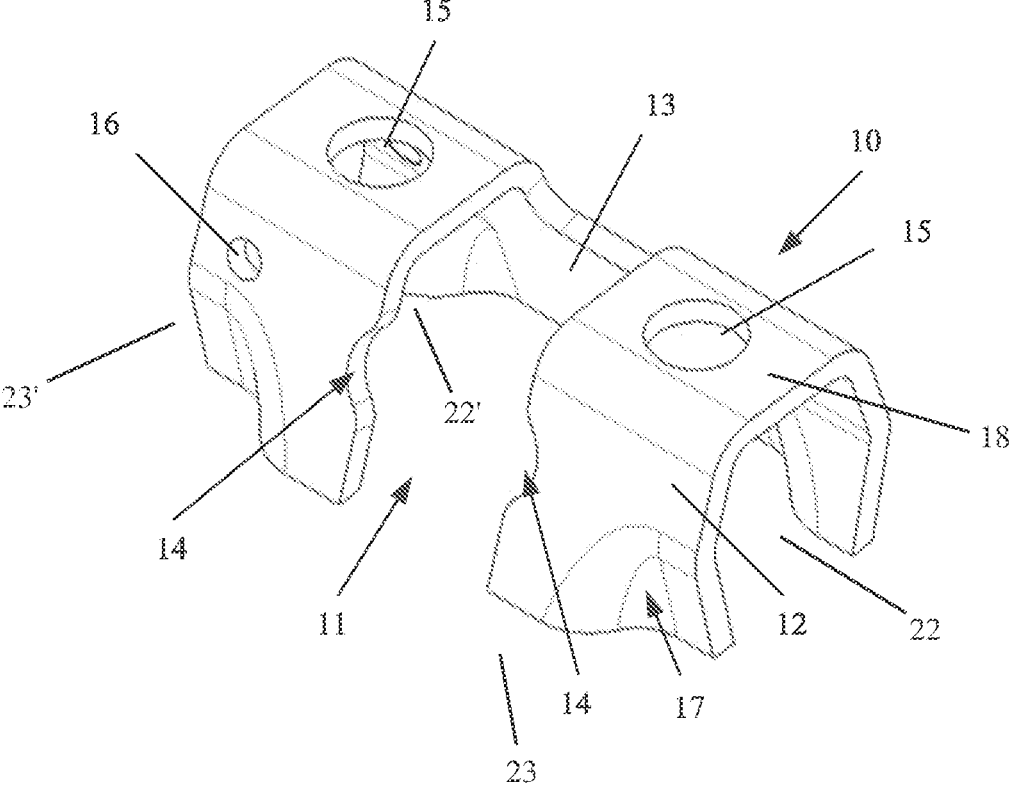
FIG. 2 is a perspective view of a U-shaped plate for a weighing module in the present invention.
Figures 3, 4:
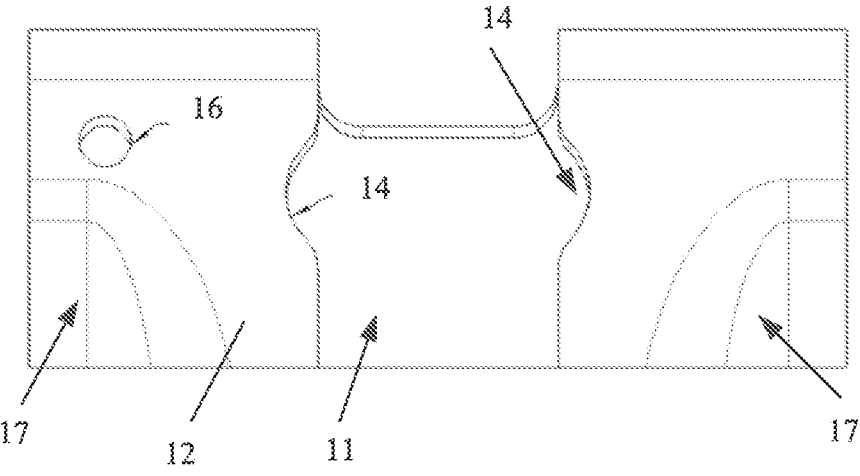
FIG. 3 is a front view of the U-shaped plate for a weighing module in the present invention.
FIG. 4 is a back view of the U-shaped plate for a weighing module in the present invention.
Figure 5:
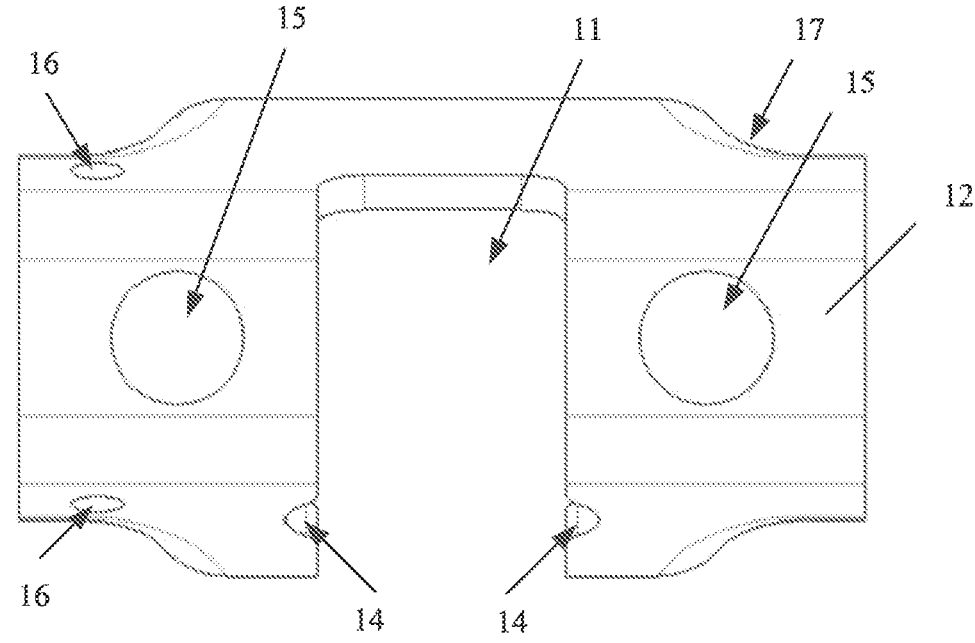
FIG. 5 is a top view of the U-shaped plate for a weighing module in the present invention.
Figure 6:
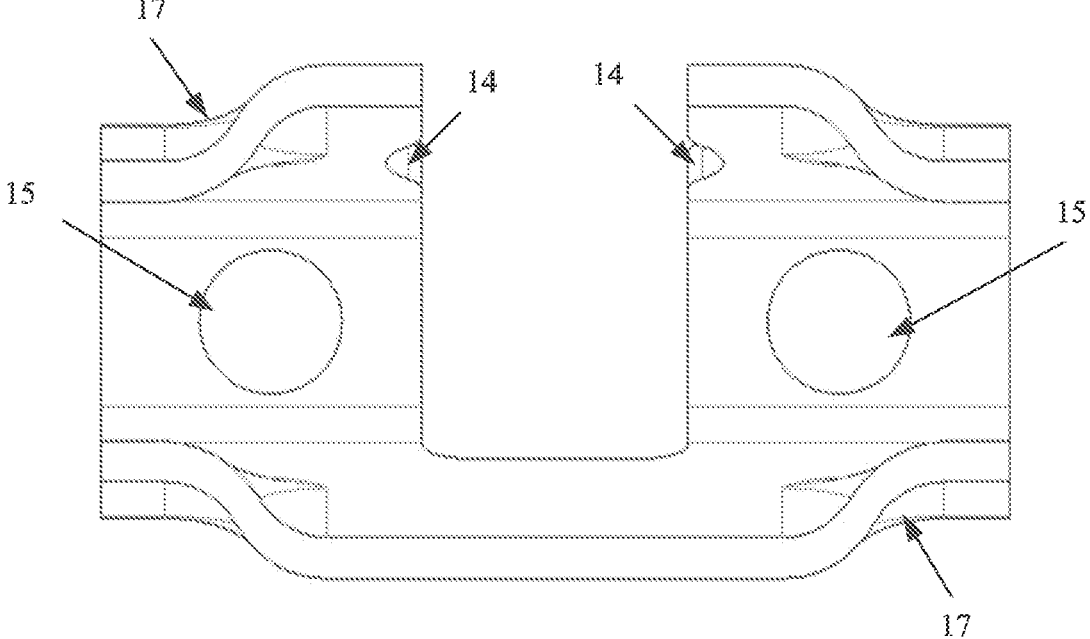
FIG. 6 is a bottom view of the U-shaped plate for a weighing module in the present invention
Figure 7:
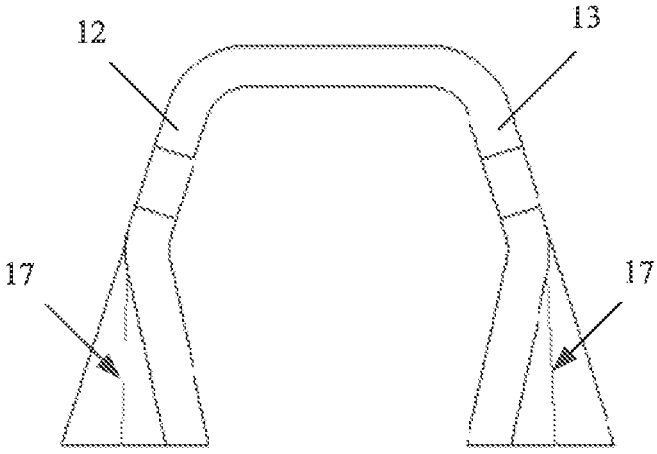
FIG. 7 is a right view of the U-shaped plate for a weighing module in the present invention.

FIG. 2 is a perspective view of a U-shaped plate for a weighing module in the present invention. FIG. 3 is a front view of the U-shaped plate for a weighing module in the present invention. FIG. 4 is a back view of the U-shaped plate for a weighing module in the present invention. FIG. 5 is a top view of the U-shaped plate for a weighing module in the present invention. FIG. 6 is a bottom view of the U-shaped plate for a weighing module in the present invention. FIG. 7 is a right view of the U-shaped plate for a weighing module in the present invention.

As shown in FIG. 2 to FIG. 7, the present invention discloses a U-shaped plate for a weighing module, said U-shaped plate 10 comprising a first side surface 12, a second side surface 13, and an upper end surface 18 connecting the first side surface 12 and the second side surface 13; the first and the second side each comprising a bottom end and an upper portion together forming four corners of the U-shaped plate. Each of the first side surface (12) and the second side surface (13) comprising an inner portion (22, 22') and an outer portion (23,23') extending on either side of the inner portion (22,22') such that the inner portion (22) and outer portion (23) of the first side surface (12) is positioned opposing the inner portion (22') and outer portion (23') of the second side surface (13).

The U-shaped plate 10 is of an inverted U-shaped structure formed by bending a flat and straight metal sheet, wherein a lower width of the U-shaped plate 10 is greater than its upper width. Since, a sensor is required to be disposed in the inner portion (22,22') of the U-shaped plate, the U-shaped plate 10 is further characterized by an opening 11 for mounting a sensor wherein said opening 11 extends from the bottom end of the first side surface 12 to the upper portion of the second side surface 13 via an upper end surface 18 wherein each of the four corners of the U-shaped plate 10 is configured as a recessed structure 17. Here, the U-shaped plate 10 may preferably be an integrally formed structure.

In order to facilitate operations of placing and removing the sensor, or providing a larger operating space, the opening 11 comprises at least a pair of inwardly formed notches 14. Further, the inwardly formed notches 14 are symmetrical in their configuration and positioned on either side of the opening 11 facing each other.

In order to enable the weighing module to have a horizontal limiting function and a tipping prevention function, the upper end surface 18 of the U-shaped plate 10 is provided with limiting holes 15. Here, the upper end surface 18 of the U-shaped plate 10 is flat Although, a front region of a flat plate is provided with the opening in the inner portion, in order to maintain structural continuity, the region, approaching the rear, of the flat plate is still consistent, and the rear is in transition with large rounded corners. A module is generally connected to a tie beam, and accordingly, the outer portions 23, 23' of the first side surface 12 and the second side surface 13 of the U shaped plate 10 are provided with at least two connecting holes 16, 16 each such that the two connecting holes 16,16 are symmetrically aligned facing each other thereby prolonging the tie beam to the utmost extent and improving measuring precision.

Preferably, the opening 11 is provided in the inner portion (22,22') of the U-shaped plate 10. A width of the opening 11 is preferably one third of a length of the U-shaped plate 10, that is, the width of the opening 11 is consistent with a width of each of two sides of the U-shaped plate. Of course, this is only an example, and the width of the opening 11 is only required to match that of the sensor.

The entire U-shaped plate 10 has a U-shaped appearance in a rectangular shape with one side narrow and one side wide. The narrow side has a plane segment. A width of the plane segment is not less than an inside diameter of the limiting hole 15. The plane segment plays a role in drop protection of the module in a vertical direction.

In addition, because the wide side of the U-shaped plate has a larger opening size and will interfere with a module mounting screw, in order to provide an enough operating space to the mounting screw and to further improve mechanical property of the U-shaped plate, each of the four corners of the U-shaped plate 10 is configured as a recessed structure 17. An angle of 8°-10° is formed between the recessed structure 17 and the vertical direction. With the arrangement of the angle, on one hand, an enough space may be provided for the mounting screw, and on the other hand, strength of the U-shaped plate 10 may be improved to the utmost extent.

Preferably, the recessed structure 17, in the normal direction, is half of a height of the U-shaped plate 10. With this design, tensile property and compression resistance in the vertical direction can be improved, if a recessed region is too high, the strength in the vertical direction will be reduced, and if it is too low, improvement in performance will be limited. The recessed region should have an appropriate height such that it is required to ensure that a peripheral region of the connecting hole is a plane, so as to meet installation reliability requirements of a connecting mechanism of the tie beam. Moreover, with the help of a molding angle of the U-shaped plate, a mounting region of other accessories is precisely located at the largest part of an internal region of the U-shaped plate.

Further, as shown in FIG. 4, the width of the U-shaped plate 10 is consistent from top to bottom, or the U-shaped plate 10 is narrow at the top and wide at the bottom. Since the conventional structure is designed to be wide at the top and narrow at the bottom, which results in a larger bending moment at the bottom, and leads to inadequate safety, the U-shaped plate design of this application improves the safety.

Figure 8:
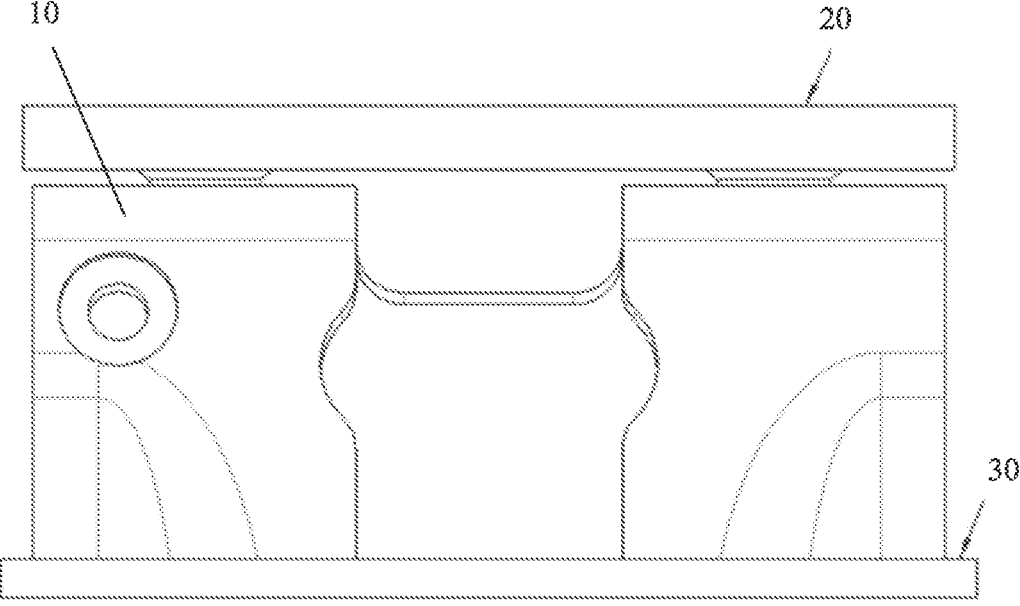
FIG. 8 is a front view of a weighing module in the present invention before a sensor is mounted therein
Figure 9:
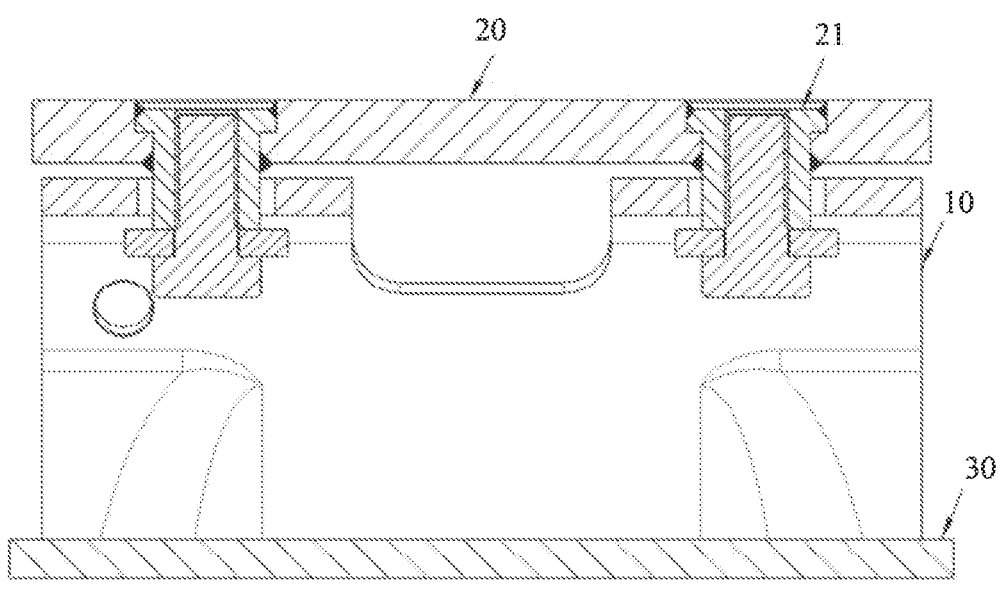
FIG. 9 is a longitudinal sectional view of the weighing module in the present invention before a sensor is mounted therein.
Figure 10:
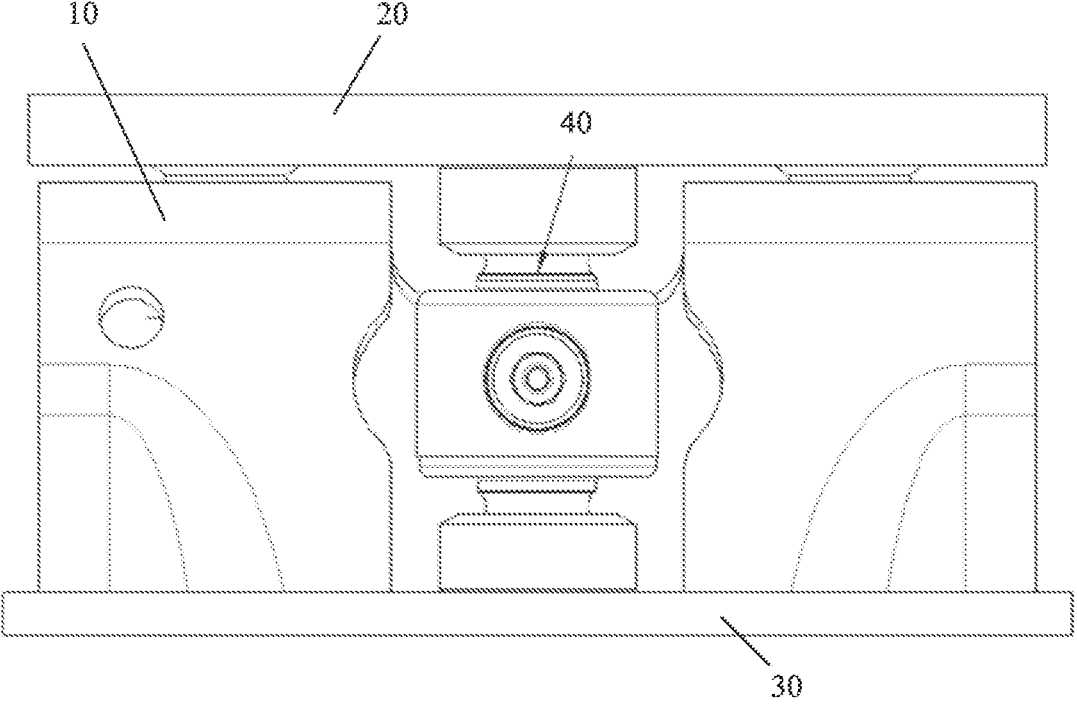
FIG. 10 is a front view of the weighing module in the present invention when a sensor is mounted therein.
Figure 11:
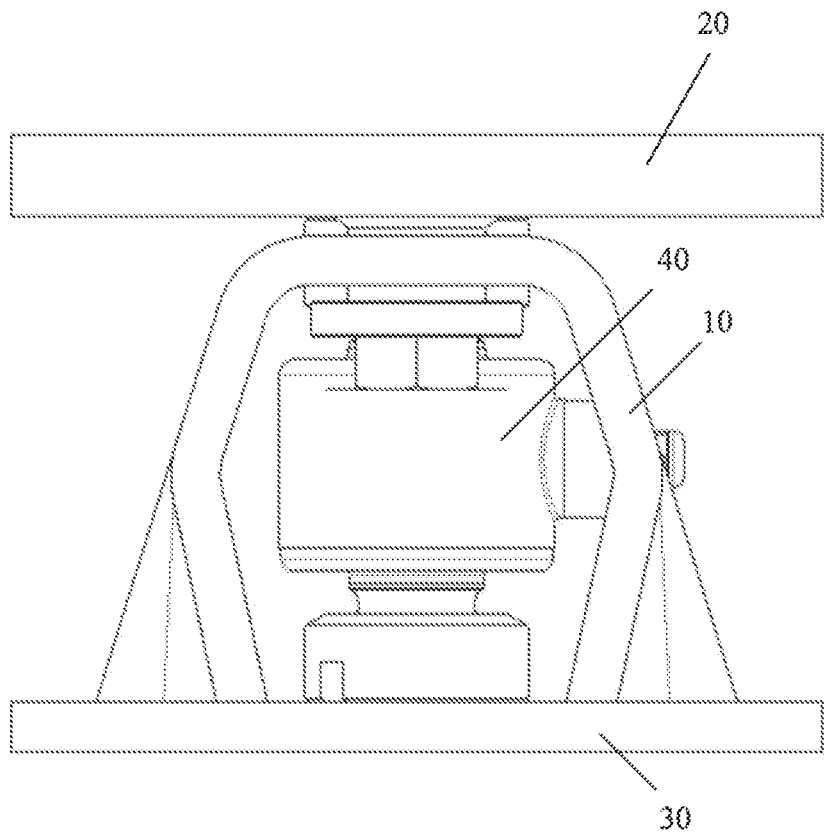
FIG. 11 is a side view of the weighing module in the present invention when a sensor is mounted therein.

FIG. 8 is a front view of a weighing module in the present invention before a sensor is mounted therein. FIG. 9 is a longitudinal sectional view of the weighing module in the present invention before a sensor is mounted therein. FIG. 10 is a front view of the weighing module in the present invention when a sensor is mounted therein. FIG. 11 is a side view of the weighing module in the present invention when a sensor is mounted therein.

As shown in FIG. 8 to FIG. 11, the present invention further provides a weighing module, which includes a top plate assembly 20, a bottom plate assembly 30, a sensor 40, and the U-shaped plate 10 for a weighing module as described above. The U-shaped plate 10 is mounted on the bottom plate assembly 30, the sensor 40 is mounted in the opening 11 of the U-shaped plate 10 and located between the top plate assembly 20 and the bottom plate assembly 30, and the top plate assembly 20 is connected to the limiting holes 15 of the U-shaped plate 10 through top plate studs 21.

Based on the above description, the U-shaped plate for a weighing module and the weighing module comprising same have the following advantages.

I. In the Use of Functions:

1. The opening in the inner portion is used for accommodating the sensor and can be used for assembly, disassembly, and daily maintenance of the sensor; and the inwardly formed notches can be used for expanding the operating space when related operations of the sensor are performed, thereby providing more possibilities for convenience of manual operations or tools. In addition, the inwardly formed notches bring aesthetical pleasure, and avoid monotonous layout of full straight edges. A hole in the upper left corner of the U-shaped plate can be optionally designed and used to be connected to other accessory mechanisms, for example, to be connected to a horizontal limiting mechanism of the module.

2. The recessed design of the four corners makes the entire U-shaped plate present a special shape and an elegant appearance; and not only the enough operating space is provided for the mounting screw of the module, but also structural strength is improved such that use requirements for large capacity and high safety can be met. This has been confirmed by finite element analysis and mechanical testing.

3. An accessory is mounted in the inner portion with the largest space inside the U-shaped plate, which is easy to operate. Moreover, the internal space of the opening of the U-shaped plate can provide an application space for other accessory functions such as accommodating a jacking tool, and accommodating a sensor working state monitoring tool, thereby achieving various maintenance functions.

4. Requirements for hygienic design are met. The upper portion is narrow, so that it is difficult for dust, rainwater, or debris to accumulate on the upper portion. The lower portion is wide and the middle portion is oblique, so that a natural downslope structure is formed, facilitating natural rolling of debris.

II. In Structural Appearance:

1. By only one part, requirements for large capacity and safety use are met, the U-shaped plate has a nice appearance and a special structure, and is simple and graceful, which presents a U shape with one side narrow and one side wide integrally; moreover, the four corners have recessed design. The opening is designed in the middle, and the opening is designed with the inwardly formed notches.

2. The rear side of the U-shaped plate is consistent integrally, which brings the following beneficial effects: by integrated blanking, the processing technology is simple and the structural continuity is maintained; by integrated molding, an original tailored welding effect of three parts is implemented by only one part, and thus, the structure is greatly simplified; and by integrated design, the U-shaped plate has a tough performance in a horizontal direction under action of cross sectional moment of inertia.

III. In Structural Strength:

The excellent mechanical property of the U-shaped plate can meet requirements for large capacity and high safety. During working, four mounting holes of the assembly are provided with the mounting screws for fastening, thereby forming fastening points of the module. A horizontal force applied to the U-shaped plate during working comes from other parts impacting on the limiting holes such that the horizontal force of the limiting holes in the upper portion is transmitted and transferred to the four mounting screw fastening points.

Firstly, in a horizontal transverse direction, the back of the U-shaped plate is of a consistently integrated structure, a great bending modulus is brought due to the cross sectional moment of inertia, which makes it impossible to deform in a horizontal longitudinal direction, thereby making the bearing capacity strong and reliable in the horizontal transverse direction. In addition, recesses at the four corners of the U-shaped plate expand the contact area and increase the cross sectional moment of inertia, thereby greatly improving the bending resistance performance, and achieving an excellent resistance of the U-shaped plate in the horizontal transverse direction.

Secondly, in the horizontal longitudinal direction, the four corners of the assembly are fixed with the screws, and a horizontal force may first cause the U-shaped plate to have a trend of longitudinal deformation; however, the U-shaped plate is narrow at the top and wide at the bottom, restricting the longitudinal deformation and upward deformation. The larger width range of narrow top and wide bottom leads to the stronger horizontal resistance. In addition, in the horizontal longitudinal direction, with the four corners recessed, the contact area between the U-shaped plate and the bottom plate is expanded. The U-shaped plate has a special-shaped root, which optimizes the bending modulus in the longitudinal direction, thereby further improving the longitudinal resistance.

Thirdly, the anti-tipping performance under a vertical pressure and in the vertical direction is improved based on the similar principle.

IV. In Processing Technology:

1. By laser-cut blanking, the shape of the overall plane is molded integrally by cutting, and tedious processes in conventional machining are avoided. Moreover, by controlling a width L1 of the opening in the middle and a width L2 of each of the two side edges, nested blanking may be implemented, avoiding material waste, that is, the opening in the middle of the U-shaped plate may be used as a side edge of another adjacent U-shaped plate, and so on.

2. In terms of a molding process, an integral press molding process is preferred after the laser-cut blanking, and thus, processing steps are greatly simplified. While others such as cast molding and stamping are also under consideration.

3. By integrated welding, weld seams are consistent during welding, operation is easy, and welding deformation is reduced.

In summary, according to the present invention, the U-shaped plate for a weighing module and the weighing module comprising same are provided; and the U-shaped plate having a novel structure, a nice appearance and a reliable performance, when used with a weighing module, perfectly matches the sensor. With the design of integrated molding, the purposes of overcoming the above-mentioned defects, realizing safety and practicability, and improving competitiveness are achieved, and solutions that meet various requirements of use are provided.

According to the present invention, the U-shaped plate for a weighing module and the weighing module comprising same are provided. The number of parts can be reduced, the total weight can be decreased, the processing time can be shortened, the processing cost can be saved, the hygienic design can be provided, a new solution can also be provided to users, and product competitiveness and use safety can be comprehensively improved, for example, the U-shaped plate is arranged in the middle of the weighing module, and is connected to the top plate or the bottom plate of the module to achieve various mechanical protection functions required by the module, such as horizontal limiting, tipping prevention, drop protection, and daily maintenance of the module.

Although specific implementations of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention. However, these alterations and modifications all fall within the scope of protection of the present invention.

REFERENCE SIGNS LIST

Top plate 100
Intermediate plate 200
Bottom plate 300
U-shaped plate 10
Opening 11
First side surface of U-shaped plate 12
Second side surface of U-shaped 13 plate
Upper end surface 18
Inner portion of the first side surface 22
Outer portion of the first side surface 23
Inner portion of the second side 22 surface
Outer portion of the second side 23 surface
Inwardly formed notch 14
Limiting hole 15
Connecting hole 16
Recessed structure 17
Top plate assembly 20
Bottom plate assembly 30
Sensor 40
Top plate stud 21

The invention claimed is:

1. A U-shaped plate for a weighing module, said U-shaped plate comprising:
   a first side surface;
   a second side surface;
   an upper end surface connecting the first side surface and the second side surface; and
   an opening for mounting a sensor;
   wherein the first and the second side surface each comprising a bottom end and an upper portion together forming four corners of the U-shaped plate;
   wherein said U-shaped plate comprises an inverted U-shaped structure, where a lower width of the U-shaped plate is greater than an upper width of the U-shaped plate;
   wherein said opening extends from the bottom end of the first side surface to the upper portion of the second side surface via an upper end surface;
   wherein each of the four corners of the U-shaped plate is configured as a recessed structure;
   wherein the opening comprises at least a pair of inwardly formed notches; and
   wherein the upper end surface of the U-shaped plate comprises limiting holes.

2. The U-shaped plate of claim 1, wherein:
   each of the first side surface and the second side surface comprise an inner portion and an outer portion extending on either side of the inner portion such that the inner portion and the outer portion of the first side surface is positioned opposing the inner portion and the outer portion of the second side surface.

3. The U-shaped plate of claim 1, wherein:

the outer portions of the first side surface and the second side surface each comprise at least a connecting hole such that the two connecting holes are symmetrically aligned and face each other.

4. The U-shaped plate of claim 1, wherein:

the opening is located in the inner portion of the U-shaped plate.

5. The U-shaped plate of claim 3, wherein:

a width of the opening is one third of a length of the U-shaped plate.

6. The U-shaped plate of claim 1, wherein:

the inwardly formed notches are symmetrical and positioned on either side of the opening facing each other.

7. The U-shaped plate of claim 1, wherein:

the upper end surface of the U-shaped plate is flat.

8. The U-shaped plate of claim 1, wherein:

the U-shaped plate is an integrally formed structure.

9. The U-shaped plate of claim 6, wherein:

an angle of 8°-10° is formed between the recessed structure and a vertical direction.

10. The U-shaped plate of claim 8, wherein:

the recessed structure, in a normal direction, is half of a height of the U-shaped plate.

11. The U-shaped plate of claim 1, wherein:

a width of the U-shaped plate is consistent from top to bottom, or the U-shaped plate is narrower at the top than the bottom.

12. A weighing module comprising:

a top plate assembly;

a bottom plate assembly;

a sensor; and the U-shaped plate of claim 1, wherein the U-shaped plate is mounted on the bottom plate assembly, and wherein the sensor is mounted in the opening of the U-shaped plate and located between the top plate assembly and the bottom plate assembly.

13. The weighing module of claim 12 wherein:

the upper end surface of the U-shaped plate comprises limiting holes;

the weighing module comprises top plate studs; and the top plate assembly is connected to the limiting holes of the U-shaped plate by way of the top plate studs.

* * * * *